United States Patent
Ray et al.

(10) Patent No.: US 6,196,320 B1
(45) Date of Patent: Mar. 6, 2001

(54) METHOD OF CLEANING A WELL BORE PRIOR TO INSTALLING A WATER BASED FLUID SYSTEM

(76) Inventors: Warren J. Ray, 103 Sedgefield Dr., Lafayette, LA (US) 70503; David G. Hines, 177 Villere Dr., Destrehan, LA (US) 70047

( * ) Notice: Subject to any disclaimer, the term of this patent is extended or adjusted under 35 U.S.C. 154(b) by 0 days.

(21) Appl. No.: 09/275,838

(22) Filed: Mar. 24, 1999

Related U.S. Application Data

(63) Continuation-in-part of application No. 09/009,974, filed on Jan. 21, 1998, now Pat. No. 5,904,208.

(51) Int. Cl.⁷ .................................................... E21B 37/06
(52) U.S. Cl. ...................... 166/312; 166/270.1; 507/929
(58) Field of Search .................... 166/311–313, 270.1; 507/927, 929

(56) References Cited

U.S. PATENT DOCUMENTS

| | | | |
|---|---|---|---|
| 3,625,286 | 12/1971 | Parker | 166/291 |
| 4,083,407 | 4/1978 | Griffin, Jr. et al. | 166/291 |
| 4,108,779 | 8/1978 | Carney | 252/8.5 P |
| 4,207,194 | 6/1980 | Sharpe et al. | 252/8.55 B |
| 4,423,781 * | 1/1984 | Thomas | 166/312 |
| 4,474,240 | 10/1984 | Oliver, Jr. et al. | 166/312 |
| 4,588,031 | 5/1986 | Oliver, Jr. et al. | 166/291 |
| 4,588,032 | 5/1986 | Weigand et al. | 166/291 |
| 5,101,902 | 4/1992 | Parcevaux et al. | 166/291 |
| 5,113,943 * | 5/1992 | Wilson et al. | 166/291 |
| 5,221,489 | 6/1993 | Bloys et al. | 252/8.551 |
| 5,904,208 * | 5/1999 | Ray et al. | 166/312 |

OTHER PUBLICATIONS

Ashland Chemical Company, Division of Ashland, Inc., "Solvent Properties Chart", 1995.

* cited by examiner

*Primary Examiner*—Roger Schoeppel
(74) *Attorney, Agent, or Firm*—Domingue & Waddell, PLC

(57) ABSTRACT

A non-aqueous system for cleaning a section of a subterranean well bore and installing a water based fluid system into the well bore. The well bore may be an open hole or contain a casing string therein. A series of spacer fluids are introduced into the well bore to displace the drilling fluid in order to clean and water wet the section of well bore. In the preferred embodiment, three spacers are pumped into the well bore including a first spacer containing a solvent, a second spacer containing a solvent and a third spacer containing a surfactant. A water based fluid system may thereafter be introduced into the well bore. The water based fluid system will be a completion fluid in the preferred embodiment.

16 Claims, No Drawings

METHOD OF CLEANING A WELL BORE PRIOR TO INSTALLING A WATER BASED FLUID SYSTEM

This application is a continuation-in-part of our prior patent application Ser. No. 09/009,974 filed Jan. 21, 1998 now U.S. Pat. No. 5,904,208, which is incorporated herein by reference.

FIELD OF THE INVENTION

This invention relates to non-aqueous systems for cleaning a subterranean well bore. More particularly, but not by way of limitation, the invention relates to non-aqueous systems for cleaning a section of a subterranean well bore prior to installing a water based fluid system. The water base fluid system may be a completion fluid. A series of spacer fluids are introduced into the well bore to displace the drilling fluid and to provide clean and water wet casing and borehole surfaces. In completion operations, the cleaned section of the well bore will provide a proper environment for placement of the water based fluid system.

BACKGROUND OF THE INVENTION

The exploration of gas and oil involves drilling a borehole into the ground through the geological formations of interest. Drilling mud is used to lubricate and cool the drill bit, to assist in bringing the drill cuttings to the surface, to provide sufficient hydrostatic pressure within the well to prevent the bore collapsing under the forces experienced underground, and to prevent the influx of fluid from the formation while drilling. The drilling mud can be either aqueous based or oil or synthetic based.

When the drilling of the borehole is completed a tubular known as a casing is secured within the borehole with cement. This insures permanence of the borehole and it prevents entry of formation fluid, other than from the formation which is being produced. It is common procedure to pump the cement down the inside of the casing to the bottom and then up the outside of the casing, between the casing and the borehole wall, until it fills and lines the section of the annulus to be cemented. That is, the space between the casing and the borehole wall. It is important that the cement lining be free of voids, that is, sections between the casing and borehole wall that is void of cement. It is also important that the cement be well bonded to both the casing and borehole wall. If good bonding is not established between the cement and the casing and borehole wall surfaces, then production from one reservoir could enter another and be lost; an undesirable fluid from one reservoir could enter the production zone of another; or the pumped fluid of an injection well could end up in the wrong zone. To ensure good bonding between cement and the appropriate surfaces, it is necessary to remove substantially all traces of drilling mud on the casing and the borehole wall. Incomplete mud removal can leave a channel behind which could prevent total isolation of a production zone. Unfortunately, the substantial complete removal of mud often proves extremely difficult. Various methods and mechanisms have been devised in an attempt to achieve complete mud removal and to provide a complete cement lining, free of voids, between the casing and the borehole wall.

One type of method includes the use of spacer fluids ahead of the cement. That is, liquids that will literally wash the mud off of the casing and borehole wall. These fluids can be pumped so that they are positioned between the cement and the mud. Such fluids can be of the type known as "chemical washes" which are usually low-viscosity liquids containing surfactants and mud thinners, or diluents. They can also be those known as "spacers", which are rather more viscous, gel-like liquids that are primarily used to form a buffer between the cement and the mud. Although it is not always clear in the literature whether a particular fluid is a spacer or a chemical wash, a spacer is generally characterized as a thickened composition that functions primarily as a fluid piston in displacing the mud. Frequently, spacers contain an appreciable amount of weighting materials, as well as fluid loss control agents. Chemical washes, on the other hand, are generally thin, or relatively non-viscous, fluids which are effective principally as a result of turbulence, dilution, and surfactant action on the mud and mud filter cake. Chemical washes may contain some solids to act as an abrasive, but the solids content is generally significantly lower than in spacers because chemical washes are typically too low in viscosity to have good solids carrying capacity. For purposes of the present invention, the term "spacer" or "spacer fluid" means both chemical washes as well as the more conventional meaning for the more viscous spacer fluids.

With respect to displacing the drilling fluid system with a water base system, operators also find it beneficial to clean the cased hole or inner diameter of the casing and fill the cased hole section with a water base mud, water base drill in fluid, seawater, brine, brine completion fluid, or completion fluid. In wells drilled with oil or synthetic base muds, the casing is run and cemented. Normally, the operator will then run cased hole logs and do testing of the casing and liner tope and may even tieback the casing to surface. After all this has been done and the cased hole, which is full of oil or synthetic base drilling fluid, is ready to be displaced to the next stage, we would then utilize a series of spacers in the non-aqueous design to displace the oil or synthetic base mud from the well bore, clean the inside of casing(s) and all tubulars, leaving all surfaces water wet and then install a water base fluid.

In completion operations, the hydrocarbon bearing reservoir is prepared for production. In the case where the well bore contains a casing string, the casing and cement is perforated, as those of ordinary skill in the art will appreciate. It has been found that fines and debris within the completion fluid tend to enter the subterranean reservoir and damage and/or destroy the permeability of the hydrocarbon zone after completing the well thereby decreasing the production. When an operator displaces a drilling mud with a water based fluid system, many of the problems previously listed with reference to cementing are faced with completion fluids. The displacement and cleanup of oil or synthetic base drilling fluids is necessary to protect the integrity of the water base fluid so it does not get contaminated with oil, to remove solids, so during completion these solids do not enter the formation and cause damage to the producing formation or cause any problems to downhole equipment or tools such as packers and to allow corrosion inhibitors, added to completion fluid to protect the casing from corrosion, to work properly by offering them a clean and water wet surface to coat. Therefore, an adequate cleaning of the down hole tubulars and removal of the drilling fluid system from the well bore is required.

Aqueous based chemical washes are taught in U.S. Pat. No. 4,207,194. These chemical washes are of the type containing one or more of: (a) at least one surfactant to remove water based drilling muds from a borehole; and (b) at least one surfactant to enhance the bonding of cement to the wall of a borehole and the casing. There is also included an effective amount of a fluid loss additive such as a mixture of at least two oil soluble particulate resins, one of which remains hard and friable, and the other of which is soft and pliable (at the temperature to be encountered in the well) when dispersed in an aqueous medium.

U.S. Pat. No. 4,108,779 teaches a water-in-oil emulsion spacer fluid which is compatible with drilling fluids and cement compositions and which is comprised of a hydrocarbon oil, salt water, an emulsifier which is comprised of a first and second fatty acid, and a surfactant-dispersant.

U.S. Pat. No. 5,101,902 teaches an aqueous spacer composition compatible with drilling muds and cement slurries which spacer composition is comprised of a biopolymer selected from the group consisting of scleroglucan and biopolymers produced by the bacteria Azotobacher indicus as an anti-settling means, a fluid loss controlling means, a wetting agent selected from the group consisting of at least one polyethoxyl ester of a $C_9$–$C_{12}$ fatty acid, and a weighting means.

U.S. Pat. No. 4,588,032 teaches a fluid spacer composition for use in well cementing, which composition is comprised of an aqueous fluid, an admixture of nonylphenols ethoxylated with from 1 to 14 moles of ethylene oxide, and preferably, at least one member selected from the group consisting of a sulfonated linear $C_8$ to $C_{18}$ straight chain alcohol ethoxylated with from 2 to 20 moles of ethylene oxide, a low molecular weight aliphatic glycol ether containing from about 3 to about 12 carbon atoms per molecule and an alcohol containing from 3 to 8 carbon atoms ethoxylated with 2 to 4 moles of ethylene oxide together with any conventionally utilized spacer additives, if desired, such as viscosifiers, weighting agents, and the like.

While there are various chemical washes and spacer fluids in commercial practice today, there is still a need in the art for ever improved techniques for displacing drilling fluids and leaving the borehole surfaces clean. Further, there is a need for an improved technique that will remove the drilling fluid system and provide for a clean environment for installation of a water based fluid. The water based fluid may be used as a completion fluid.

SUMMARY OF THE INVENTION
(A) DISPLACING DRILLING FLUID PRIOR TO CEMENTING

In accordance with the present invention, there is provided a method for cleaning a section of a well borehole prior to a cementing operation, said borehole having a casing suspended therein, and containing therein an oil or synthetic-based drilling fluid, the method comprising:

a) displacing the drilling fluid with a first spacer fluid from the section of said borehole to be cemented, said first spacer fluid comprised of water, an effective amount of solid particles for weighting, and from about 1 to 20 vol. % of a surfactant, wherein a polymeric component is used in amounts such that said first spacer fluid has a higher yield point than the drilling fluid;

b) pumping into said borehole a second spacer fluid, under turbulent flow conditions, which second spacer fluid is comprised of a solvent with respect to drilling fluid residue in said borehole, and which is used in an amount to effectively remove and displace substantially all of any remaining drilling fluid residue and to displace said first spacer fluid from the cleaned section of the borehole; and c) pumping into said borehole a third spacer fluid which is a water-based composition comprised of an aqueous solution of a surfactant component, wherein the amount of surfactant is about 1 to 20 vol. %, based on the total volume of said spacer fluid, and wherein said third spacer fluid is used in an amount that will effectively displace substantially all of said second spacer fluid and leave at least the cleaned section of said borehole substantially water wet.

In a preferred embodiment of the present invention the density of said first spacer fluid is equal to or greater than the density of the drilling fluid.

In another preferred embodiment of the present invention the viscosity of the first and third spacer fluid is increased with a naturally occurring gum or other polymeric material.

In yet another preferred embodiment of the present invention the polymeric component is selected from xanthan gum, and a high molecular weight cellulose derivative such as carboxymethylcellulose (CMC), hydroxyethylcellulose (HEC), and hydroxypropylcellulose (HPC).

In still another preferred embodiment of the present invention the surfactant is non-ionic and is selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}$+alcohols, polyethylene glycols of all molecular weights and reactions, and polypropylene glycols of all molecular weights and reactions.

Also in accordance with the present invention there is provided a method for cleaning a section of a borehole prior to a cementing operation, said borehole having a casing suspended therein, and containing therein an oil or synthetic-based drilling fluid, the method comprising:

a) displacing drilling fluid with a first spacer fluid from the section of said borehole to be cemented, said first spacer fluid comprised of a weighted solvent, which solvent is an effective solvent with respect to drilling fluid residue in the borehole;

b) pumping into said borehole, under turbulent flow conditions, a second spacer fluid which is comprised of a solvent with respect to drilling fluid residue in the borehole, and which is used in an amount which is effective to remove and displace substantially all of any remaining drilling fluid residue and said first spacer fluid from the section of the borehole to be cemented;

c) pumping into said borehole a third spacer fluid which is comprised of an aqueous solution of a surfactant component, wherein the amount of surfactant is about 1 to 20 vol. %, based on the total volume of the fluid, and wherein the fluid is used in an amount that will effectively displace substantially all of said second spacer fluid and leave the section of the borehole to be cemented substantially water wet.

In another preferred embodiment of the present invention the solvent of one or both of the first and second spacer fluids is a terpene hydrocarbon.

In a preferred embodiment of the present invention a diluent oil is used prior to the introduction of said first spacer fluid of step (a) for either one or both of the aqueous and the non-aqueous spacer systems to initiate displacement of the drilling fluid.

In still another preferred embodiment of the present invention the diluent oil is selected from the group consisting of: a conventional base oil for drilling fluids, white mineral oils, paraffinic solvents, silicone oils, crude oils, distillates such as kerosenes and diesel fuels, gasolines, naphthas, alcohols, plant oils, and synthetic oils including, but not limited to, esters and olefins.

In yet another preferred embodiment of the present invention the solvent which is the base for any one or more of the spacer fluids for either the aqueous system or the non-aqueous system is selected from the terpenes hydrocarbons.

Also in accordance with the present invention cement is pumped into the borehole after treatment with the spacer fluids, in such an amount to displace any remaining spacer fluid and to fill the cleaned annular space defined by the casing tubular and the borehole wall.

(B) DISPLACING DRILLING FLUID PRIOR TO INSTALLING WATER BASED FLUID SYSTEM

In another preferred embodiment, a method for cleaning a section of a well bore containing oil or synthetic base drilling fluid prior to installing a water base fluid is disclosed. In the most preferred embodiment, the drilling fluid is being replaced prior to a completion operation, with the completion operation including placement of a completion fluid. The method for replacing the drilling fluid within a well bore comprises:

a) displacing the drilling fluid with a first spacer fluid from the section of said well bore to be completed, the first spacer fluid comprised of a weighted solvent, which solvent is an effective solvent with respect to drilling fluid residue in the well bore;

b) pumping into the well bore, under turbulent flow conditions, a second spacer fluid which is comprised of a solvent with respect to drilling fluid residue in the well bore, and which is used in an amount which is effective to remove and displace substantially all of any remaining drilling fluid residue and the first spacer fluid from the section of the well bore to be cleaned;

c) pumping into the well bore a third spacer fluid which is comprised of an aqueous solution of a surfactant component, wherein the amount of surfactant is about 1 to 20 vol. %, based on the total volume of the fluid, and wherein the fluid is used in an amount that will effectively displace substantially all of the second spacer fluid and leave the section of the well bore to be cleaned substantially water wet.

In one embodiment, prior to the introduction of any spacer fluid, an effective amount of a diluent oil is introduced into the well bore to dilute the drilling fluid and to initiate the displacement of the drilling fluid from the well bore. The diluent oil is selected from the group consisting of: a conventional base oil for drilling fluids, white mineral oils, paraffinic solvents, silicone oils, crude oils, kerosenes, distillates, gasolines, naphthas, alcohols, plant oils, and synthetic oils, including but not limited to, esters and olefins.

The viscosity of the third spacer fluid may be increased with a naturally occurring gum or a polymeric material. Also, the polymeric component is selected from the group consisting of xanthan gum, and a high molecular weight cellulose derivative such as carboxymethylcellulose (CMC), hydroxyethylcellulose (HEC), and hydroxypropylcellulose (HPC).

The surfactant of the third spacer is a non-ionic surfactant and is selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}+$ alcohols, polyethylene glycols of all molecular weights and reactions, and polypropylene glycols of all molecular weights and reactions; preferred are ethoxylated octyl phenols, polypropylene glycols, ethoxylated linear alcohols, and ethoxylated nonyl phenols; more preferred are ethoxylated linear alcohols, and ethoxylated nonyl phenols.

In another preferred embodiment, the solvent comprising the first spacer fluid and the second spacer fluid is selected from the group consisting of glycols, ethers, esters, linear alkanes, cyclic alkanes, mineral oils, plant oils, aromatics, ketones, chlorinated solvents, amines, alcohols, petroleum naphthas, and terpene hydrocarbons. In another embodiment, the solvent is a terpene hydrocarbon.

Also in accordance with the present invention, the water based fluid system is pumped into the well bore after treatment with the spacer fluids, in such an amount to displace any remaining spacer fluid. In the most preferred embodiment, the water based fluid system is a completion fluid.

DETAILED DESCRIPTION OF THE INVENTION (A) GENERAL

It is to be understood that the terms "drilling fluid" and "drilling mud" are used interchangeably herein. Drilling muds are typically classified based on the composition of the liquid phase, such as: fresh-water, salt-water, emulsion, oil, and synthetic based. Synthetic based muds are more biodegradable and more dispersible in seawater or brine, than traditional oil base muds, however, they are more difficult to remove from the metal surfaces of drilling equipment. Muds may be further classified according to components, type of chemical treatment, or application. Drilling mud normally consists of the following fractions:

1. Liquid (water, oil, or both), which is the major fraction by volume.
2. Noncolloidal solids (sand, iron ore, barite, hematite), frequently the major component by weight.
3. Colloidal solids (clays, organic colloids), the major fraction in determining performance and properties of the mud.
4. Dissolved chemicals (mineral lignin, barium carbonate, sodium bicarbonate, formaldehyde, etc.) used to thicken muds and to control filtration.

The drilling muds which are of interest of cleaning from boreholes prior to cementing and/or replacing with a water based fluid system in the practice of the present invention are the oil based muds, both synthetic oils and natural based oils.

Before cementing well casings in a borehole, drilling mud must first be removed, or displaced from the section of the borehole to which the casing will be cemented. Contact between cement and the drilling fluid is be avoided because the two are typically incompatible and often results in detrimental interactions. This incompatibility can contribute to failure to obtain a satisfactory bond between the cement and the wall of the borehole and between the cement and the casing. In applications where oil-based drilling fluids are used, the incompatibility often results in contamination, or commingling, of mud with cement, and cement with mud. Extreme viscosities often arise from such commingling, causing excessive pressures and pumping problems. In some cases this leads to undesirable formation breakdown. When a portion of the drilling fluid is commingled with cement premature setting of the cement can occur and conversely, when drilling fluids are contaminated with cement, the properties advantageously characteristic of drilling fluids are adversely affected. The problem of commingling can be overcome by separating the cement and the drilling fluid by what is called a "spacer" fluid. Furthermore, it is the function of these spacer fluids to clean the borehole to such a degree as to provide good bonding between the cement and the casing and the borehole wall.

As previously mentioned, it is preferred that the present invention be used in wells in which oil or synthetic based drilling fluids (muds) are employed. Among the problems associated with drilling muds is that the liquid phase of the drilling mud tends to flow from the well into exposed permeable formations with the result that mud solids are filtered out on the wall of the borehole and a filter cake of mud-like material is formed thereon. This mud-like material is a barrier to proper bonding of cement which is needed to produce an impermeable bond between the casing and the borehole wall. In an ideal cementing operation the filter cake would be removed from the borehole wall and replaced by the cement slurry to permit the formation of a solid layer of hardened, cured and bonded cement between the casing and the geologic formation through which the borehole passes.

As those of ordinary skill in the art will appreciate, it is very difficult to adequately remove filter cake from a borehole, and often the borehole is not sufficiently clean for the cementing operation and/or an open hole completion. In such cases remedial cement squeeze operations must be used, which are extremely costly and which may also be harmful to the production of the well. The spacer systems of the present invention will leave the borehole wall and the casing clean of residual mud and filter cake. They will also provide said surfaces with enhanced water wet properties which enhance bonding of the aqueous based cement to the casing and the borehole wall.

With reference to replacing the drilling fluid with a water based fluid system, drilling mud must first be removed, or displaced from the well bore. Contact between the water based fluid and the drilling fluid is be avoided because the two are also typically incompatible and often results in detrimental interactions. This incompatibility can contribute to improper displacement of the drilling mud and failure to remove the drilling mud from the inner diameter of the casing string. In applications where oil-based drilling fluids are used, the incompatibility often results in contamination, or commingling, of mud with the water base fluid, and water base fluid with mud. Extreme viscosities often arise from such commingling, causing excessive pressures and pumping problems. In some cases this leads to undesirable formation breakdown. When a portion of the drilling fluid is commingled with water base fluid, the water base fluid becomes contaminated and conversely, when drilling fluids are contaminated with water base fluid, the properties advantageously characteristic of drilling fluids are adversely affected. The problem of commingling can be overcome by separating the water base fluid and the drilling fluid by what is called a "spacer" fluid. Furthermore, it is the function of these spacer fluids to clean the inner diameter of the casing and all tubulars, leaving all surfaces water wet and then install a water base fluid.

In wells drilled with oil or synthetic base muds, the casing is run and cemented. Normally, the operator will then run cased hole logs and do testing of the casing and liner tope and may even tieback the casing to surface. After all this has been done and the cased hole, which is full of oil or synthetic base drilling fluid, is ready to be displaced to the next stage, we would then utilize a series of spacers in the non-aqueous design to displace the oil or synthetic base mud from the well bore, clean the inside of casing(s) and all tubulars, leaving all surfaces water wet and then install a water base fluid. The displacement and cleanup of oil or synthetic base drilling fluids is necessary to protect the integrity of the water base fluid so it does not get contaminated with oil, to remove solids, so during completion these solids do not enter the formation and cause damage to the producing formation or cause any problems to downhole equipment or tools such as packers and to allow corrosion inhibitors, added to completion fluid to protect the casing from corrosion, to work properly by offering them a clean and water wet surface to coat.

Any oil and/or gas borehole can be cleaned in accordance with the present spacer systems regardless of their angle or deviation from vertical to horizontal. Cleaning the well bore, or a section of the well hole, containing a casing, in accordance with the present invention will result in clean tubulars, leaving all surfaces water wet. Further, cleaning the well bore prior to completion will leave a bore hole that is adequately cleaned for placement of the completion fluid.

(B) DISPLACING THE DRILLING FLUID PRIOR TO CEMENTING

The present invention relates to both an aqueous and a non-aqueous spacer system for cleaning the section of a well bore. The section of the well borehole to be cleaned may be to cement a casing string in place or to install a water base fluid system. The aqueous spacer system is comprised of three spacer fluids, the first being a weighted aqueous based surfactant, preferably a non-ionic surfactant fluid, the second being an organic solvent based fluid, and the third being an aqueous based surfactant fluid which leaves the borehole water wet. The non-aqueous spacer system is also comprised of three spacer fluids, the first being a weighted solvent fluid, the second being an organic solvent based fluid, and the third being an aqueous based surfactant, preferably a non-ionic surfactant fluid which leaves the borehole water wet.

The first spacer fluid of the aqueous system is pumped into the well bore to displace that portion of drilling fluid in the annulus of the borehole to be subsequently cemented, and to start the cleaning process. This first spacer is a relatively high viscosity, high yield point water based spacer containing particulate weighting material and a surfactant, preferably a non-ionic surfactant. This first spacer will initiate water wetting of the borehole wall and casing. Further, this first spacer will: a) have a density less than, or equal to, or greater than, preferably equal to or greater than, the density of the drilling fluid, b) have a higher yield point than the drilling fluid, and C) be used, in volume of barrels, of from 1 to 200%, preferably from about 1 to 100% of annular space between the borehole wall and the casing. The "yield point" of a drilling fluid is a measurement under flowing conditions of the force in drilling fluid that causes gel structure to develop when the drilling fluid is at rest. This first spacer will also contain from about 1 to about 20%, based on the total volume of said first spacer, of a surfactant, preferably a non-ionic surfactant. Non-limiting examples of non-ionic surfactants which may be used in the practice of the present invention include those selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}$+alcohols, polyethylene glycols of all molecular weights and reactions, and polypropylene glycols of all molecular weights and reactions. Preferred are ethoxylated octyl phenols, polypropylene glycols, ethoxylated linear alcohols, and ethoxylated nonyl phenols. More preferred are ethoxylated linear alcohols, and ethoxylated nonyl phenols. The spacer will need a polymeric component. The polymeric component is selected from xanthan gum, and a high molecular weight cellulose derivative such as carboxymethylcellulose (CMC), hydroxyethylcellulose (HEC), and hydroxypropylcellulose (HPC).

Solids suitable for use herein as weighting agents are those which are conventionally used in the drilling industry and which are substantially water and liquid hydrocarbon insoluble. Non-limiting examples of such solids include bentonite, diatomaceous earth, barite, hematite or other iron oxides, fly ash, other finely ground solids, and the like. The weighting agents can also serve as scrubbing agents. The weighting agent is used in an amount sufficient to provide the desired composition density. The particle size of the solids used herein are any size which is conventionally used for drilling fluids and spacers. For example, clay, or bentonite particles are typically extremely fine and range from about 0.05 to 5 microns, averaging about 0.5 microns. Fly ash particles, on the other hand, are on the order of about 100 times greater than that of bentonite, or about 0.5 to 200 microns, averaging about 50 microns. The precise particle size used for weighting the spacer fluids of the present invention is not important as long as the spacer fluids meet their intended objective.

The second spacer of the aqueous system is used to detach and displace drilling fluid residue and to displace said first spacer fluid. This second spacer, which is pumped into the borehole under turbulent conditions, is a solvent which is capable of chemically detaching, or dissolving, drilling fluid residue from the casing and the borehole wall. The density of this second spacer will be from about 7 pounds per gallon (ppg) to about 20 ppg. This second spacer can also include weighting material, but it should be realized that as the viscosity is increased turbulent flow will be reduced. The viscosity of this second spacer will preferably be less than about 2 cps. Non-limiting examples of solvents which can be used as this second spacer include: glycols, such as propylene glycol, ethylene glycol, hexylene glycol, dipropylene glycol, diethylene glycol, tripropylene glycol, and triethylene glycol; poly glycols; ethers, such as monomethyl ether; glycol ethers; alkanes and cyclic alkanes, such as pentane, hexane, and cyclohexane, heptane; mineral oils, such as seal oil; plant oils, such as the terpenes (which are preferred); esters; aromatics, such as benzene, toluene, xylene, and ethyl benzene; ketones, such as acetone, methyl ethyl ketone, methyl propyl ketone, methyl isobutyl ketone, methyl isoamyl ketone, diacetone alcohol, methyl amyl ketone, cyclohexanone, diisobutyl ketone, and isophorone; chlorinated solvents, such as methylene chloride; chloroform, 1,1,1-trichlorethane, ethylene dichloride, trichlorethylene, propylene dichloride, perchlorethylene, monochlorobenzene, and orthodichlorobenzene; amines, such as isopropyl amine, ethyl amine, diethyl amine, butyl amine, diisopropyl amine, triethyl amine, morpholine, cyclohexylamine, dimethylethanoamine, dibutyl amine, tetraethylene pentamine, momoisopropanolamine, diethylethanoamine, monoethanolamine, diethanolamine, diisopropanolamine; alcohols, such as methanol, ethanol, isopropanol, n-propanol, isobutanol, n-butanol, amyl alcohol, methyl amyl alcohol, cyclohexanol, and 2-ethylhexanol; and petroleum naphthas.

The third spacer of the aqueous system is pumped down the well bore, preferably at turbulent conditions. It will displace at least a portion, preferably substantially all, of said second spacer fluid and remove any remaining solids. It will also finalize the water wetting process. This third spacer can be a viscosified composition, or a non-viscosified composition. Both the viscosified and the non-viscosified forms can contain from about 1 to about 20 vol. % of a water based surfactant, preferably a non-ionic surfactant. The third spacer can be viscosified, and if so it can be weighted to be from about 8 to 20 pounds per gallon. Weighting materials suitable for use with this third spacer are any of those conventionally used in the drilling industry, and which non-limiting list was set forth previously herein. The volume of third spacer used will be from about 1 to 200%, preferably from about 1 to 100% of annular space between the borehole and casing. The water used for this third spacer fluid composition can be salt water or fresh water. This third spacer can also be viscosified with a polymeric component if a more viscous composition is needed. Non-limiting examples of polymeric materials suitable for use herein include xanthan gum, and high molecular weight cellulose derivatives such as carboxymethylcellulose (CMC), hydroxyethylcellulose (HEC), and hydroxypropylcellulose (HPC). Preferred are xanthan gum and HEC. This spacer may also contain the previously mentioned surfactants.

As previously mentioned, the present invention also relates to a non-aqueous spacer system for treating, or cleaning, a well borehole prior to cementing. The non-aqueous spacer system of the present invention is comprised of a series of three spacer fluids. The first spacer fluid is pumped into the borehole to displace that portion of the drilling fluid in the annulus of the borehole to be subsequently cemented, and to start the cleaning process. This first spacer is a somewhat high viscosity weighted solvent spacer characterized as having: (a) a density less than, equal to or greater than, preferably equal to or greater than the density of the drilling fluid, (b) be used, in a volume of barrels of from 1 to 200%, preferably from about 1 to 100% of annular volume between the bore hole wall and the casing. Weighting materials suitable for use with this first spacer are any of those conventionally used in the drilling industry and which non-limiting list was set forth previously herein. The viscosity of this first spacer fluid for the non-aqueous system can be increased, preferably with a relatively short chain oil-soluble polymer material. The solvent is the same as used for the second spacer fluid in both the aqueous and the non-aqueous systems herein. That is, it is a solvent with respect to drilling fluid, or mud, residue in the borehole being cleaned.

The second spacer of the non-aqueous system is used to detach and displace drilling fluid residue and to displace said first spacer fluid. This second spacer, which is pumped into the borehole under turbulent conditions, is a solvent which is capable of chemically detaching or dissolving drilling fluid residue from the casing and the borehole wall. The viscosity of the second spacer will preferably be less than about 2 cps. Non-limiting examples of solvents which can be used as this for all of the solvent spacer fluids of the present invention include: glycols, such as propylene glycol, ethylene glycol, hexylene glycol, dipropylene glycol, diethylene glycol, tripropylene glycol, and triethylene glycol; poly glycols; ethers, such as monomethyl ether; glycol ethers; alkanes and cyclic alkanes, such as pentane, hexane, and cyclohexane, heptane; mineral oils, such as seal oil; plant oils, such as the terpenes (which are preferred); esters; aromatics, such as benzene, toluene, xylene, and ethyl benzene; ketones, such as acetone, methyl ethyl ketone, methyl propyl ketone, methyl isobutyl ketone, methyl isoamyl ketone, diacetone alcohol, methyl amyl ketone, cyclohexanone, diisobutyl ketone, and isophorone; chlorinated solvents, such as methylene chloride; chloroform, 1,1,1-trichlorethane, ethylene dichloride, trichlorethylene, propylene dichloride, perchlorethylene, monochlorobenzene, and orthodichlorobenzene; amines, such as isopropyl amine, ethyl amine, diethyl amine, butyl amine, diisopropyl amine, triethyl amine, morpholine, cyclohexylamine, dimethylethanoamine, dibutyl amine, tetraethylene pentamine, momoisopropanolamine, diethylethanoamine, monoethanolamine, diethanolamine, diisopropanolamine; alcohols, such as methanol, ethanol, isopropanol, n-propanol, isobutanol, n-butanol, amyl alcohol, methyl amyl alcohol, cyclohexanol, and 2-ethylhexanol; and petroleum naphthas.

The third spacer of the non-aqueous system, which is substantially the same as the third spacer fluid for the aqueous system herein, is pumped down the borehole, preferably in turbulent conditions. It will displace at least a portion, preferably substantially all, of said second spacer fluid and remove any remaining solids. It will also finalize the water wetting process. This third spacer can be a viscosified composition, or a non-viscosified composition. Both the viscosified and the non-viscosified forms can contain from about 1 to about 20 vol. % of a water based surfactant, as previously listed for the aqueous system above. This spacer can be viscosified, and it can also be weighted from about 8 to 20 pounds per gallon. Weighting materials suitable for use with this spacer are any of those conventionally used in the drilling industry, and which non-limiting list was set forth previously herein. The volume of this spacer will be from about 1 to 200%, preferably from about 1 to 100% of annular volume between the borehole wall and the casing. The water used for this spacer fluid composition can be salt water or fresh water. This third spacer can also be viscosified with a polymeric component if a more viscous composition is needed. Non-limiting examples of polymeric materials suitable for use herein include xanthan gum, and high molecular weight cellulose derivatives such as carboxymethylcellulose (CMC), hydroxyethylcellulose (HEC), and hydroxypropylcellulose (HPC). Preferred are xanthan gum and HEC.

This second spacer fluid, as well as the second spacer fluid of the aqueous spacer system, is used under turbulent conditions and is effective for chemically detaching mud residue from the casing and the mud cake from the borehole. These spacers are in contact with the well bore for an effective amount of time. That is, for a time which is effective to remove substantially all of the residual mud residue and mud cake from the borehole. This amount of time will typically be from about 1 to 15 minutes, preferably from about 1 to 10 minutes.

All spacer fluids, both for the aqueous and the non-aqueous systems may also include other materials for their known purposes, such as kaolinite, gilsonite, cellophane flakes, and the like for lost circulation control, provided they do not render the spacer incompatible with the mud or the cement and provided they do not interfere with the desired turbulent flow of the spacers. Where a cement is to contain a lost circulation material, for instance, the same material may be employed in the spacer. Minor amounts of an antifoaming agent may be included to provide better mixing properties, e.g., up to about 1 percent by weight of water. Where a formation is present which is sensitive to fresh water, such as certain shales or clay containing sandstone, a salt such as an alkali metal halide may be incorporated in the spacer.

In the embodiments of the present invention for both the aqueous and the non-aqueous systems, a diluent oil may be first pumped down the borehole to dilute the drilling fluid and to initiate displacement of the drilling fluid. By "diluent oil" we mean an organic liquid, preferably an oil, which is substantially the same as, or is compatible with, the oil which is used as the base for the drilling fluid in the borehole being treated. Non-limiting examples of organic liquids that can be used as the diluent oil include the base-oil of the drilling mud of the borehole being serviced, as well as crude oils, distillate oils, gasolines, naphthas, kerosenes, fuel oils, white oils, oils derived from coal or shale, aromatic oils, silicone oils, mineral seal oils, alcohols and paraffinic solvents. Also suitable as a diluent are vegetable oils which include babassu oil, castor oil, coconut oil, corn oil, cottonseed oil, hemp oil, linseed oil, oiticica oil, olive oil, palm oil, peanut oil, rape oil, safflower, sesame oil, soybean, sunflower, and tung oil., and synthetic oils. Also suitable are the terpenes, preferably limonene and terpinol. Other terpene related derivatives composed of carbon, hydrogen, and oxygen, and having 10 carbon atoms with 0, 1 or 2 hydroxyl groups, and 0, 1 or 2 double bonds, may be used in alternate embodiments. The hydroxyl group helps break the hydrogen bonding of sludge to metal surfaces. The terpene alcohols are effective in dispersion or emulsion systems. Synthetic oils are a preferred class of compounds for use as the diluent oil, especially esters, diethers, olefins, and detergent alkylate, as well as mixtures thereof. Synthetic oils also include hydrocarbon oils and halo-substituted hydrocarbon oils such as polymerized and interpolymerized olefins, for example polybutylenes, polypropylenes, propylene-isobutylene copolymers, chlorinated polybutylenes, poly(1-hexenes), poly(1-octenes), poly(1-decenes); alkylbenzenes, such as dodecylbenzenes, tetradecylbenzenes, dinonylbenzenes, di-(2-ethylhexyl)benzenes; polyphenyls such as biphenyls, terphenyls, and alkylated polyphenyls; and alkylated diphenyl ethers and alkylated diphenyl sulfides and derivatives, analogs and homologs thereof.

After the drilling fluid has been displaced and the borehole wall and casing cleaned in accordance with the present invention, the casing can be cemented to the bore walls by conventional means.

C) DISPLACING DRILLING FLUID PRIOR TO INSTALLING WATER BASED SYSTEM

In the most preferred embodiment of this application, a method for cleaning a section of a well bore prior to installing a water base fluid is disclosed. The teachings of this invention include use of the water base fluid to displace the oil or synthetic base drilling fluid out and clean the cased hole or the inside of the casing(s) and fill the cased hole section (displace it) with either water base mud, water base drill in fluid, sea water, brine, brine completion fluid, or a completion fluid system. In the most preferred embodiment, the drilling fluid within the well bore will be removed and in its place a completion fluid is placed. As noted earlier, it is important to remove the drilling fluid from the borehole and casing walls due to undesirable effects including the commingling the drilling fluid with a water based fluid. In other words, it is well known in the art that when displacing the drilling fluid with a water based system, problems may occur at the interface and within the well borehole as noted in the discussion regarding cementing operations. Also, it is important to remove any drilling mud residue within the bore hole and well bore, all as previously mentioned. These and other problems will be solved by the present invention.

In one of the embodiments, the borehole will be an open hole section. In other words, the subterranean reservoir which will be ultimately produced does not contain a casing string, and the teachings of this invention relate to this type of completion. In the most preferred embodiment, the borehole has a casing suspended therein and is referred to as a well bore and the casing string is cemented into the bore hole, as is well understood by those of ordinary skill in the art.

This embodiment relates to a non-aqueous spacer system for treating, or cleaning, a well borehole prior to installing a water based system, and in particular, before completing to a subterranean reservoir. The non-aqueous spacer system of the present invention is comprised of a series of three spacer fluids. The first spacer fluid is pumped into the well borehole to displace that portion of the drilling fluid in the well bore to start the cleaning process. This first spacer is a somewhat high viscosity weighted solvent spacer characterized as having: (a) a density less than, equal to or greater than, preferably equal to or greater than the density of the drilling fluid, (b) be used, in a volume of barrels of from 1 to 200%, preferably from about 1 to 100% of annular volume between the casing the work string pipe. Weighting materials suitable for use with this first spacer are any of those conventionally used in the drilling industry and which non-limiting list was set forth previously herein. The viscosity of this first spacer fluid for the non-aqueous system can be increased, preferably with a relatively short chain oil-soluble polymer material. The solvent is the same as used for the second spacer fluid in both the aqueous and the non-aqueous systems of the system used for cement preparation. That is, it is a solvent with respect to drilling fluid, or mud, residue in the well borehole being cleaned.

The second spacer of the non-aqueous system is used to detach and displace drilling fluid residue and to displace said first spacer fluid. This second spacer, which is pumped into the well bore under turbulent conditions, is a solvent which is capable of chemically detaching or dissolving drilling fluid residue from the casing, or open hole borehole wall. The viscosity of the second spacer will preferably be less than about 2 cps. Non-limiting examples of solvents which can be used as this for all of the solvent spacer fluids of the present invention include: glycols, such as propylene glycol, ethylene glycol, hexylene glycol, dipropylene glycol, diethylene glycol, tripropylene glycol, and triethylene glycol; poly glycols; ethers, such as monomethyl ether; glycol ethers; alkanes and cyclic alkanes, such as pentane, hexane, and cyclohexane, heptane; mineral oils, such as seal oil; plant oils, such as the terpenes (which are preferred); esters; aromatics, such as benzene, toluene, xylene, and ethyl benzene; ketones, such as acetone, methyl ethyl ketone, methyl propyl ketone, methyl isobutyl ketone, methyl isoamyl ketone, diacetone alcohol, methyl amyl ketone, cyclohexanone, diisobutyl ketone, and isophorone; chlorinated solvents, such as methylene chloride; chloroform, 1,1,1-trichlorethane, ethylene dichloride, trichlorethylene, propylene dichloride, perchlorethylene, monochlorobenzene, and orthodichlorobenzene; amines, such as isopropyl amine, ethyl amine, diethyl amine, butyl amine, diisopropyl amine, triethyl amine, morpholine, cyclohexylamine, dimethylethanoamine, dibutyl amine, tetraethylene pentamine, momoisopropanolamine, diethylethanoamine, monoethanolamine, diethanolamine, diisopropanolamine; alcohols, such as methanol, ethanol, isopropanol, n-propanol, isobutanol, n-butanol, amyl alcohol, methyl amyl alcohol, cyclohexanol, and 2-ethylhexanol; and petroleum naphthas.

The third spacer of this non-aqueous system, which is substantially the same as the third spacer fluid for the aqueous system of the cement system, is pumped down the well bore, preferably in turbulent conditions. It will displace at least a portion, preferably substantially all, of said second spacer fluid and remove any remaining solids. It will also finalize the water wetting process. This third spacer can be a viscosified composition, or a non-viscosified composition. Both the viscosified and the non-viscosified forms can contain from about 1 to about 20 vol. % of a water based surfactant, as previously listed for the aqueous system above. This spacer can be viscosified, and it can also be weighted from about 8 to 20 pounds per gallon. Weighting materials suitable for use with this spacer are any of those conventionally used in the drilling industry, and which non-limiting list was set forth previously in the discussion relating to the cementing system. The volume of this spacer will be from about 1 to 200%, preferably from about 1 to 100% of annular volume between the casing wall and the drill pipe. The water used for this spacer fluid composition can be salt water or fresh water. This third spacer can also be viscosified with a polymeric component if a more viscous composition is needed. Non-limiting examples of polymeric materials suitable for use herein include xanthan gum, and high molecular weight cellulose derivatives such as carboxymethylcellulose (CMC), hydroxyethylcellulose (HEC), and hydroxypropylcellulose (HPC). Preferred are xanthan gum and HEC.

The second spacer fluid, as well as the second spacer fluid of the previously discussed aqueous spacer system of the cementing system, is used under turbulent conditions and is effective for chemically detaching mud residue from the casing and the mud cake from the well borehole. These spacers are in contact with the well bore for an effective amount of time. That is, for a time which is effective to remove substantially all of the residual mud residue and mud cake from the borehole. This amount of time will typically be from about 1 to 15 minutes, preferably from about 1 to 10 minutes.

All spacer fluids for the completion fluid system may also include other materials for their known purposes, such as kaolinite, gilsonite, cellophane flakes, and the like for lost circulation control, provided they do not render the spacer incompatible with the mud or the completion fluid and provided they do not interfere with the desired turbulent flow of the spacers. Where a completion fluid is to contain a lost circulation material, for instance, the same material may be employed in the spacer. Minor amounts of an antifoaming agent may be included to provide better mixing properties, e.g., up to about 1 percent by weight of water. Where a formation is present which is sensitive to fresh water, such as certain shales or clay containing sandstone, a salt such as an alkali metal halide may be incorporated in the spacer.

In the embodiments of the present invention for the non-aqueous systems for installing a water based system, a diluent oil may be first pumped down the borehole to dilute the drilling fluid and to initiate displacement of the drilling fluid. By "diluent oil" we mean an organic liquid, preferably an oil, which is substantially the same as, or is compatible with, the oil which is used as the base for the drilling fluid in the borehole being treated. Non-limiting examples of organic liquids that can be used as the diluent oil include the base-oil of the drilling mud of the borehole being serviced, as well as crude oils, distillate oils, gasolines, naphthas, kerosenes, fuel oils, white oils, oils derived from coal or shale, aromatic oils, silicone oils, mineral seal oils, alcohols and paraffinic solvents. Also suitable as a diluent are vegetable oils which include babassu oil, castor oil, coconut oil, corn oil, cottonseed oil, hemp oil, linseed oil, oiticica oil, olive oil, palm oil, peanut oil, rape oil, safflower, sesame oil, soybean, sunflower, and tung oil., and synthetic oils. Also suitable are the terpenes, preferably limonene and terpinol. Other terpene related derivatives composed of carbon, hydrogen, and oxygen, and having 10 carbon atoms with 0, 1 or 2 hydroxyl groups, and 0, 1 or 2 double bonds, may be used in alternate embodiments. The hydroxyl group helps break the hydrogen bonding of sludge to metal surfaces. The terpene alcohols are effective in dispersion or emulsion systems. Synthetic oils are a preferred class of compounds for use as the diluent oil, especially esters, diethers, olefins, and detergent alkylate, as well as mixtures thereof. Synthetic oils also include hydrocarbon oils and halo-substituted hydrocarbon oils such as polymerized and interpolymerized olefins, for example polybutylenes, polypropylenes, propylene-isobutylene copolymers, chlorinated polybutylenes, poly(1-hexenes), poly(1-octenes), poly(l-decenes); alkylbenzenes, such as dodecylbenzenes, tetradecylbenzenes, dinonylbenzenes, di-(2-ethylhexyl) benzenes; polyphenyls such as biphenyls, terphenyls, and alkylated polyphenyls; and alkylated diphenyl ethers and alkylated diphenyl sulfides and derivatives, analogs and homologs thereof.

After the drilling fluid has been displaced and the inner diameter of the well bore cleaned a water base mud, a water based drilling fluid, sea water, brine, brine completion fluid or completion fluid system is installed in accordance with the present invention. In the case where a completion fluid was installed, the well will be completed to the proper subterranean reservoir as is well understood by those of ordinary skill in the art. The completion fluid may be potassium chloride (KCL), sodium chloride (NaCl), calcium chloride (CaCl2), calcium bromide (CaBr2), zinc bromide (ZnBr2), ammonium chloride (NH4Cl), sodium formate and combinations thereof.

From the foregoing, it will be apparent that there has been herein described a process for removing drilling fluid materials from a borehole which is especially effective prior to the introduction of aqueous fluid cement for improved cement bonding results. Various changes and alterations may be made in the practice of this process by those skilled in the art without departing from the spirit of the invention. It is intended that such changes be included within the scope of the appended claims.

What is claimed is:

1. A method for cleaning a well bore prior to a completion operation, said well bore containing therein an oil or synthetic-based drilling fluid and a drilling fluid residue the method comprising:
   a) displacing the drilling fluid from said well bore to be completed with a first spacer fluid, said first spacer fluid comprised of a weighted solvent, which solvent is capable of chemically detaching or dissolving the drilling fluid residue from the well bore;
   b) pumping into said well bore, under turbulent flow conditions, a second spacer fluid which is comprised of a solvent with respect to drilling fluid residue in the well bore, and which is used in an amount which is effective to remove and displace substantially all of any remaining drilling fluid residue and said first spacer fluid from said well bore to be completed;
   c) pumping into said well bore a third spacer which is comprised of an aqueous solution of a surfactant component, wherein the amount of surfactant is about 1 to 20 vol. %, based on the total volume of said third spacer, and wherein the third spacer fluid is used in an amount that will effectively displace substantially all of said second spacer fluid and leave said well bore to be completed substantially water wet.

2. The method of claim 1 wherein prior to the introduction of any spacer fluid a diluent oil is introduced into said well bore to dilute the drilling fluid and to initiate the displacement of the drilling fluid from the well bore.

3. The method of claim 2 wherein the diluent oil is selected from the group consisting of: a conventional base oil for drilling fluids, white mineral oils, paraffinic solvents, silicone oils, crude oils, kerosenes, distillates, gasolines, naphthas, alcohols, plant oils, and synthetic oils, including but not limited to, esters and olefins.

4. The method of claim 1 wherein the viscosity of the third spacer fluid is increased with a naturally occurring gum or a polymeric material.

5. The method of claim 4 wherein the polymeric component is selected from xanthan gum, and a high molecular weight cellulose derivative such as carboxymethylcellulose (CMC), hydroxyethylcellulose (HEC), and hydroxypropyl-cellulose (HPC).

6. The method of claim 1 wherein the surfactant of the third spacer is a non-ionic surfactant and is selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}+$alcohols, polyethylene glycols of all molecular weights and reactions, and polypropylene glycols of all molecular weights and reactions; preferred are ethoxylated octyl phenols, polypropylene glycols, ethoxylated linear alcohols, and ethoxylated nonyl phenols; more preferred are ethoxylated linear alcohols, and ethoxylated nonyl phenols.

7. The method of claim 1 wherein the solvent comprising said first spacer fluid and said second spacer fluid is selected from the group consisting of glycols, ethers, esters, linear alkanes, cyclic alkanes, mineral oils, plant oils, aromatics, ketones, chlorinated solvents, amines, alcohols, petroleum naphthas, and terpene hydrocarbons.

8. The method of claim 7 wherein the solvent is a terpene hydrocarbon.

9. A method for replacing a drilling fluid contained within a well bore, said well bore containing therein an oil or synthetic-based drilling fluid and a drilling fluid residue, the method comprising:
   a) displacing the drilling fluid from said well bore with a first spacer fluid, said first spacer fluid comprised of a weighted solvent, which solvent is capable of chemically detaching or dissolving the drilling fluid residue from the well bore;
   b) pumping into said well bore, under turbulent flow conditions, a second spacer fluid which is comprised of a solvent with respect to drilling fluid residue in said well bore, and which is used in an amount which is effective to remove and displace substantially all of any remaining drilling fluid residue and said first spacer fluid from said well bore to be completed;
   c) pumping into said well bore a third spacer which is comprised of an aqueous solution of a surfactant component, wherein the amount of surfactant is about 1 to 20 vol. %, based on the total volume of said third spacer, and wherein third spacer fluid is used in an amount that will effectively displace substantially all of said second spacer fluid and leave said well bore to be completed substantially water wet.

10. The method of claim 9 wherein the well bore contains an open hole section.

11. The method of claim 9 wherein the well bore contains a casing string and the method further includes:
   pumping a water based fluid system, and wherein said water based fluid system is selected from the group consisting of potassium chloride, sodium chloride, calcium chloride, calcium bromide, zinc bromide, ammonium chloride or sodium formate.

12. The method of claim 11 wherein the viscosity of the third spacer fluid is increased with a naturally occurring gum or a polymeric material.

13. The method of claim 12 wherein the polymeric component is selected from xanthan gum, and a high molecular weight cellulose derivative such as carboxymethylcellulose (CMC), hydroxyethylcellulose (HEC), and hydroxypropylcellulose (HPC).

14. The method of claim 11 wherein the surfactant of the third spacer is a non-ionic surfactant and is selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}$+alcohols, polyethylene glycols of all molecular weights and reactions, and polypropylene glycols of all molecular weights and reactions; preferred are ethoxylated octyl phenols, polypropylene glycols, ethoxylated linear alcohols, and ethoxylated nonyl phenols; more preferred are ethoxylated linear alcohols, and ethoxylated nonyl phenols.

15. The method of claim 11 wherein the solvent comprising said first spacer fluid and said second spacer fluid is selected from the group consisting of glycols, ethers, esters, linear alkanes, cyclic alkanes, mineral oils, plant oils, aromatics, ketones, chlorinated solvents, amines, alcohols, petroleum naphthas, and terpene hydrocarbons.

16. The method of claim 11 wherein the solvent is a terpene hydrocarbon.

* * * * *